(12) United States Patent
Kim et al.

(10) Patent No.: US 8,028,600 B2
(45) Date of Patent: Oct. 4, 2011

(54) SHIFTING APPARATUS FOR DUAL CLUTCH TRANSMISSION

(75) Inventors: Youngkwang Kim, Yongin-si (KR);
Wonbong Cho, Anyang-si (KR);
Kwangsoo Nam, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 56 days.

(21) Appl. No.: 12/620,917

(22) Filed: Nov. 18, 2009

(65) Prior Publication Data

US 2010/0147097 A1 Jun. 17, 2010

(30) Foreign Application Priority Data

Dec. 11, 2008 (KR) ........................ 10-2008-0125723

(51) Int. Cl.
*F16H 3/08* (2006.01)
(52) U.S. Cl. ........................................ 74/473.1; 74/330
(58) Field of Classification Search .................... 74/330, 74/331, 340, 473.1, 473.36, 473.37
See application file for complete search history.

(56) References Cited

U.S. PATENT DOCUMENTS

| | | | | |
|---|---|---|---|---|
| 4,449,416 A | * | 5/1984 | Huitema | 74/336 R |
| 6,173,624 B1 | * | 1/2001 | Decker | 74/473.37 |
| 2006/0201269 A1 | * | 9/2006 | Maillard et al. | 74/340 |
| 2006/0266141 A1 | * | 11/2006 | Ogami | 74/325 |

FOREIGN PATENT DOCUMENTS

| | | |
|---|---|---|
| FR | 2873776 A1 * | 2/2006 |
| KR | 10-0528039 B1 | 11/2005 |
| KR | 10-2006-0115963 A | 11/2006 |
| KR | 10-0851373 B1 | 8/2008 |

* cited by examiner

*Primary Examiner* — Richard W Ridley
*Assistant Examiner* — Terence Boes
(74) *Attorney, Agent, or Firm* — Knobbe Martens Olson & Bear LLP

(57) ABSTRACT

A shift apparatus for a dual clutch transmission includes a plurality of shift lugs and a shift operating module moving the shift lugs. The apparatus provides a simple structure and sufficient rigidity and durability, in addition to a simple shift of a gear. The apparatus further provides an automatic releasing function that automatically releases the prior shift stage and an active inter-lock function that prevents gears connected to the same clutch from being engaged simultaneously, and enables 6-3-stage and 5-2-stage skip shift.

13 Claims, 14 Drawing Sheets

(A)

(B)

(C)

(D)

SHIFTING APPARATUS FOR DUAL CLUTCH TRANSMISSION

CROSS-REFERENCE TO RELATED APPLICATIONS

The present application is based on, and claims priority from, Korean Application Serial Number 10-2008-0125723, filed on Dec. 11, 2008, the disclosure of which is hereby incorporated by reference herein in its entirety.

FIELD

The present disclosure relates to a shifting apparatus for a dual clutch transmission.

BACKGROUND

Dual clutch transmissions are shift systems that are composed of two sets of clutches, unlike single disc clutch transmission systems, designed to operate odd-numbered stages using a first clutch and even-numbered stages using a second clutch, and which makes it comfortable to drive, such as automatic transmissions, and also can further reduce fuel consumption than vehicles equipped with manual transmissions.

Further, dual clutch transmissions have an advantage of providing very smooth shift, because acceleration stop that appears in single disc clutch transmissions does not occur.

Necessary parts for controlling the dual clutch transmissions are a clutch actuator that connects or disconnects the clutch, a shift actuator that performs actual shift of gear by controlling the shift fork of the transmission, and a controller that controls the actuators on the basis of the vehicle speed and the open amount of throttle valves.

In addition to a function of simply performing the shift of gear, the shift actuator should have an automatic-releasing function that automatically releases the prior shift stage and an active inter-lock function that prevents gears connected to the same clutch from being simultaneously engaged.

It is preferable that durability is ensured and skip shift, such as 6-3-stage and 5-2-stage shift, is possible, in addition to providing the basic function required for the shifting apparatuses of the dual clutch transmission using simple configuration and structure.

The foregoing discussion is to provide general background information, and does not constitute an admission of prior art.

SUMMARY

Embodiments of the present invention provide a shift apparatus for a dual clutch transmission that provides a simple structure and sufficient rigidity and durability, and in addition to simple shift of a gear, provides an automatic releasing function that automatically releases the prior shift stage and an active inter-lock function that prevents gears connected to the same clutch from being engaged simultaneously, and enables 6-3-stage and 5-2-stage skip shift.

An aspect of the invention provides a shift apparatus for a dual clutch transmission which includes: shift lugs and a shift operating means. The shift lugs are connected to shift forks to transmit straight movement force and arranged to define a portion of a circle. The shift operating means rotates and moves straight on the central axis of the circle defined by the shift lugs such that any one of the shift lugs moves straight to engage a shift stage and the other one is released to the neutral state.

The shift lugs may be open to the axis of the circle defined by the shift lugs and closed at both sides by fan-shaped flanges in the axial direction of the circle.

The shift operating means may include a select shaft, an automatic releasing unit, a shift unit, a select driving unit, and a shift driving unit. The select shaft is disposed coaxially with the circle defined by the shift lugs. The automatic releasing unit radially protrudes from the select shaft and is inserted between both flanges of the shift lugs while rotating with the select shaft. The shift unit is disposed to rotate with the select shaft and move straight on the select shaft with respect to the select shaft. The select driving unit rotates the select shaft. The shift driving unit drives the shift unit to move straight on the select shaft.

The select driving unit may include a select motor generating rotational force and a gear train transmitting the rotational force of the select motor to the select shaft as rotational force. Further, the shift driving unit may include a shift motor generating rotational force and a straight movement converting means converting the rotational force of the shift motor into straight movement force and transmitting the straight movement force to the shift unit.

Four shift lugs may be sequentially arranged at about 45° from each other to define a semicircle, the automatic releasing unit may include releasing pins radially protruding at about 180° from the select shaft and a roller rotatably combined with the releasing pins, and the shift unit may include a shift pipe having a slit through which the releasing pins pass and covering the select shaft, and shift pins radially protruding from the shift pipe and disposed at about 90° from the releasing pins to be inserted between both flanges of the shift lugs.

The shift lugs may be disposed adjacent to shift lugs connected to a shift forks shifting shift stages connected or disconnected by different clutches in two clutches of the transmission, and shift lugs connected to shift forks shifting shift stages connected or disconnected by the same clutches are disposed at phases of about 90°.

The straight movement converting means of the shift driving unit may include a lead screw driven by the shift motor, a screw nut moving straight on the lead screw, and a transmitting fork integrally connected with the screw nut and restraining both sides of the shift unit.

The four shift lugs, of which two adjacent shift lugs make a pair, respectively, may be arranged symmetrically with respect to the center of circle defined by the shift lugs and shift lugs connected to the shift fork that shifts the shift stages connected or disconnected by the same clutch are symmetrically arranged with respect to the center of the circle, the automatic releasing unit may be formed of a releasing finger that radially protrudes from a select shaft, and the shift unit may be composed of a shift pipe that has a slit through which the releasing finger passes to prevent rotation and allow straight movement with respect to each other, and covers the select shaft, and shift pins that radially protrude from the shift pipe and are arranged at about 90° and about 180° from the releasing finger to be inserted between both flanges of the shift lug.

The straight movement converting means of the shift driving unit may include a lead screw driven by the shift motor, a screw nut moving straight on the lead screw, and a rotary lever transmitting the straight motion of the screw nut to the straight motion of the shift pipe.

One aspect of the invention provides a simple structure and sufficient rigidity and durability, and in addition to simple shift of a gear, provides an automatic releasing function that automatically releases the prior shift stage and an active inter-lock function that prevents gears connected to the same clutch from being engaged simultaneously, and enables 6-3-stage and 5-2-stage skip shift.

BRIEF DESCRIPTION OF THE DRAWINGS

For better understanding of the nature and features of the present invention, reference should be made to the following detailed description with the accompanying drawings, in which.

DETAILED DESCRIPTION OF EMBODIMENTS

Embodiments of the invention are described hereafter in detail with reference to the accompanying drawings.

Referring to FIGS. 1 to 8, a shift apparatus for a dual clutch transmission according to an embodiment of the present invention includes shift lugs that are connected to shift pokes 1 to transmit straight motion force to them and disposed to define a portion of a circle together with each other; and a shift operating means that pivots and moves straight on the central axis of the circle defined by the shift lugs such that any one of the shift lugs are engaged with a shift stage while moving straight and another one is automatically released to the neutral state.

The shift lugs are shaped such that they are open to the central axis of the circle defined by the shift lugs and both sides are closed by fan-shaped flanges in the axial direction of the circle.

In the illustrated embodiment, four shift lugs are provided and they are sequentially arranged at about 45° distances to form a semi circle.

The shift lugs are disposed adjacent to shift lugs connected to shift forks 1 shifting the shift stages that are connected or disconnected by different clutches of two clutches of the transmission, such that shift lugs connected to shift forks 1 shifting the shift stages connected or disconnected by the same clutch are disposed at a phase of about 90° from each other.

Figure 1:
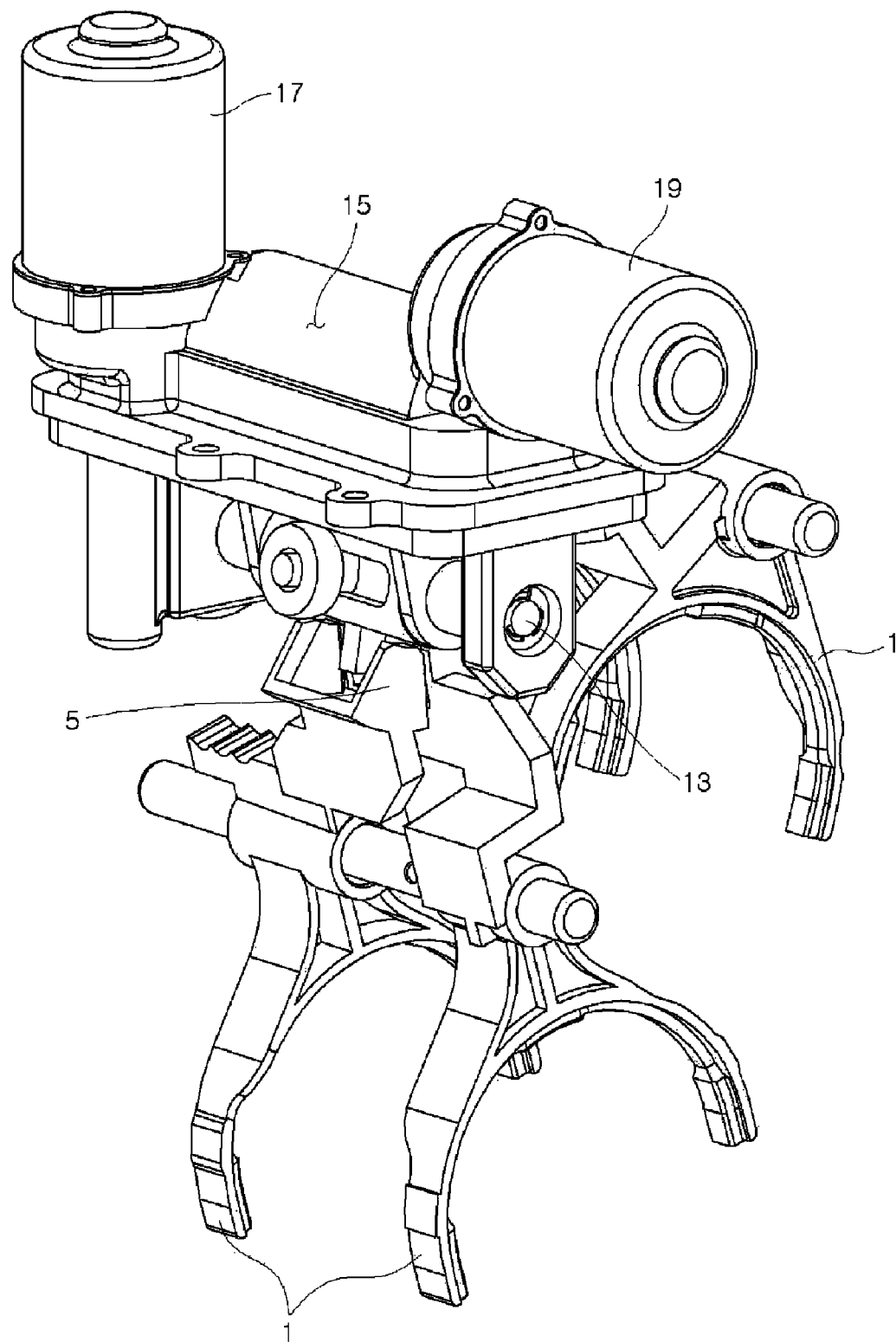
FIG. 1 is a view showing an embodiment of a shifting apparatus for a dual clutch transmission according to one embodiment of the present invention.
Figure 2:
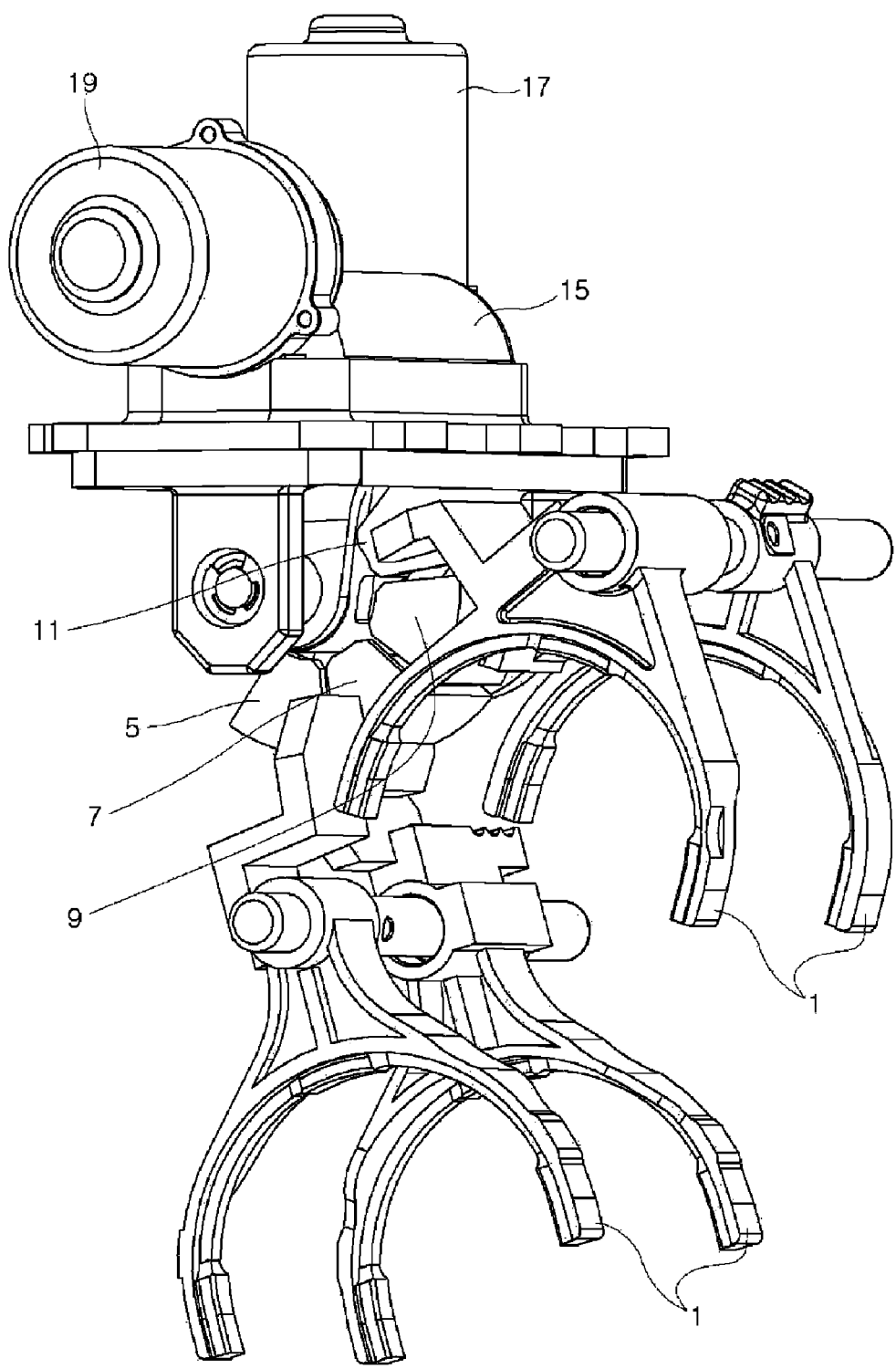
FIG. 2 is a view showing the configuration of FIG. 1, seen in another direction.
Figure 3:
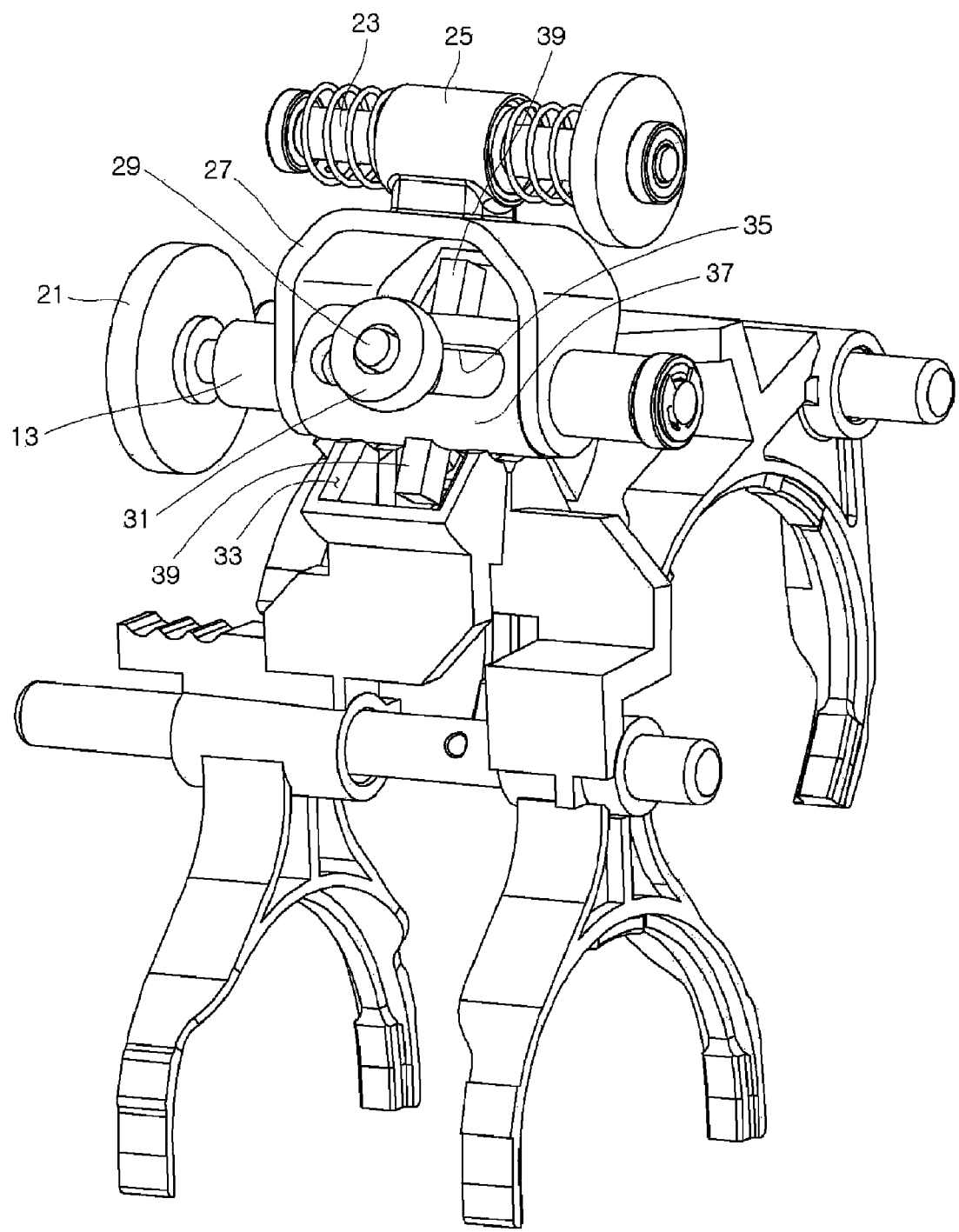
FIG. 3 is a view removing some parts of FIG. 1.
Figure 4:
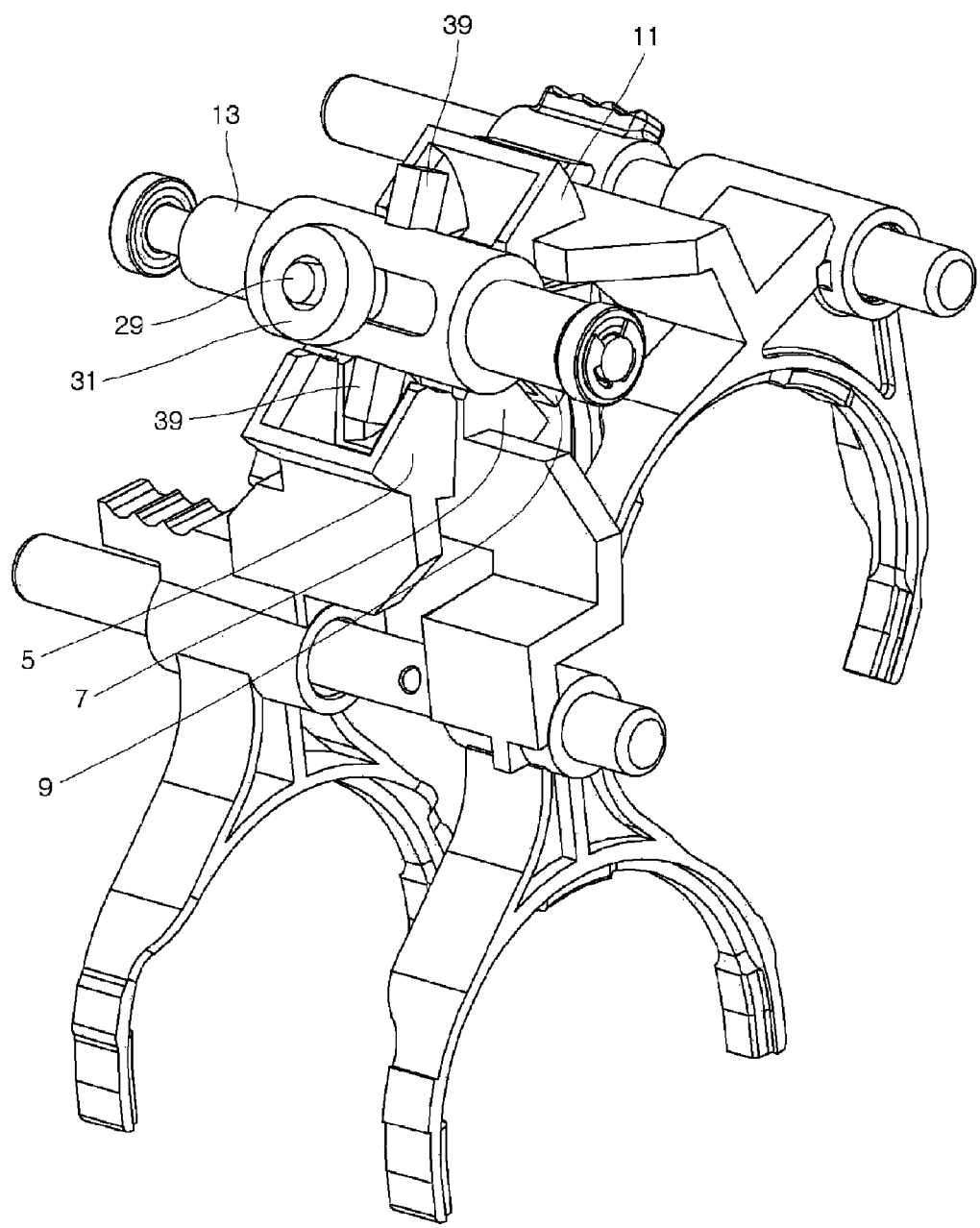
FIG. 4 is a view removing some parts of FIG. 3.
Figure 5:
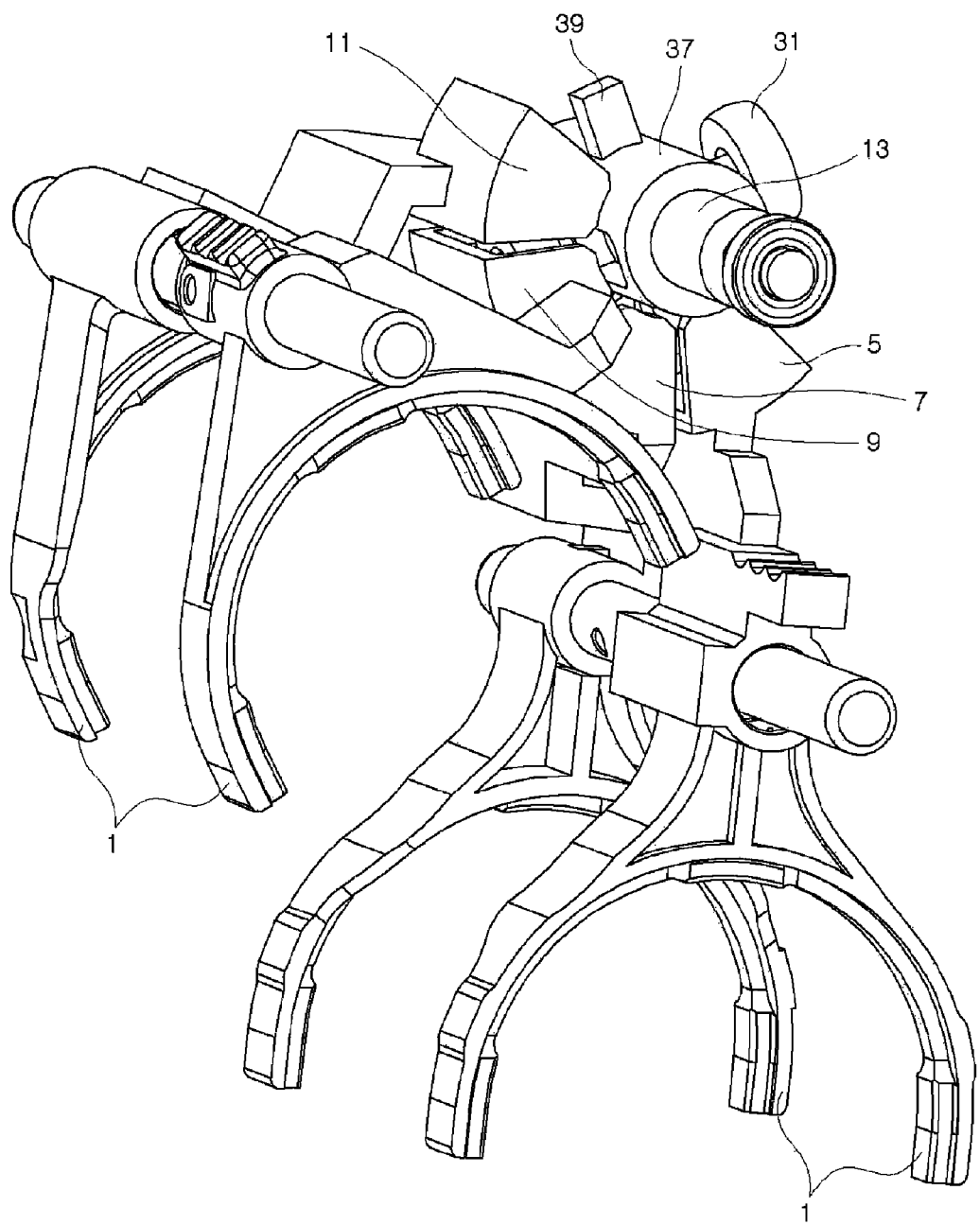
FIG. 5 is a view showing the configuration of FIG. 4, seen in another direction.
Figure 6:
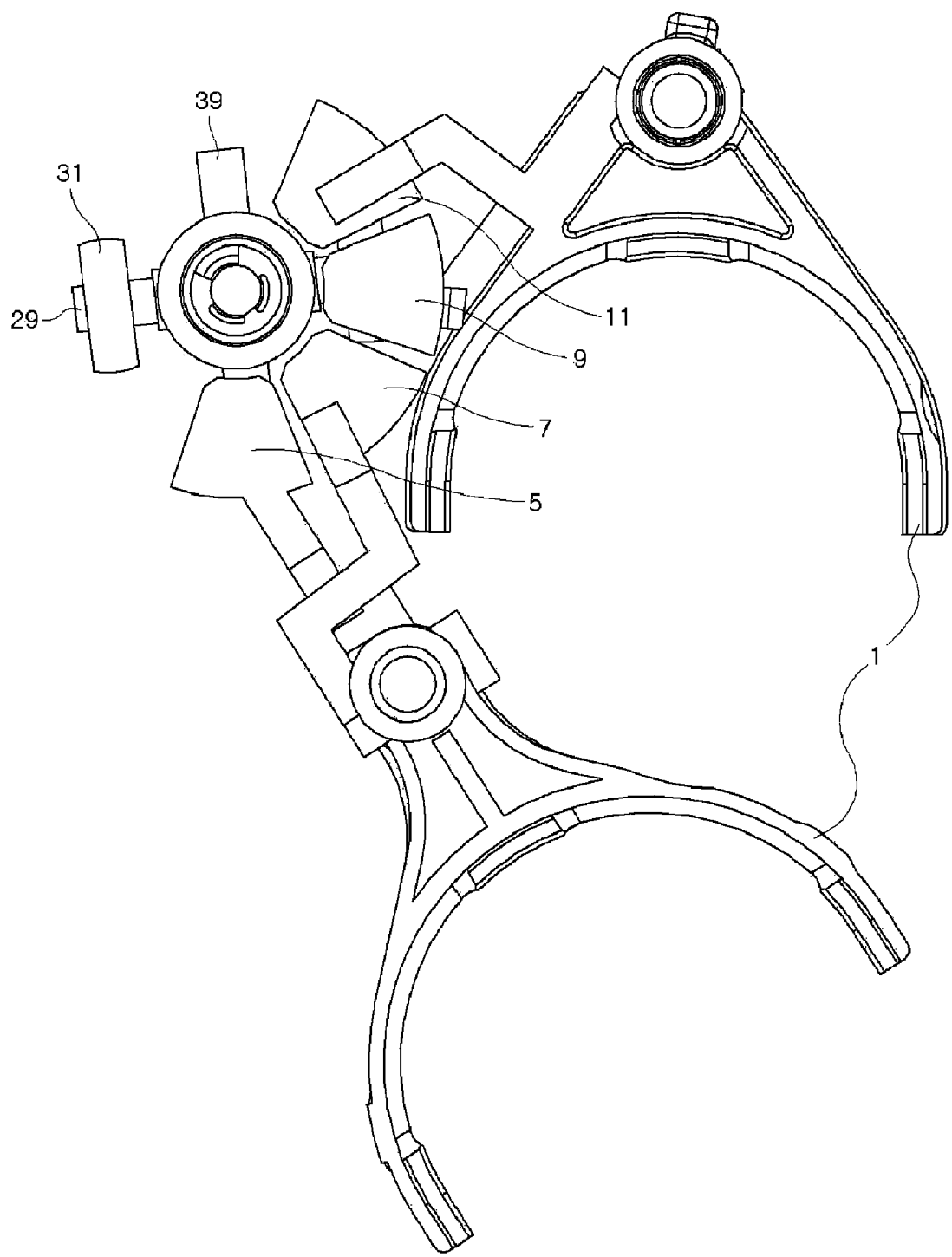
FIG. 6 is a right side view of FIG. 4.
Figure 7:
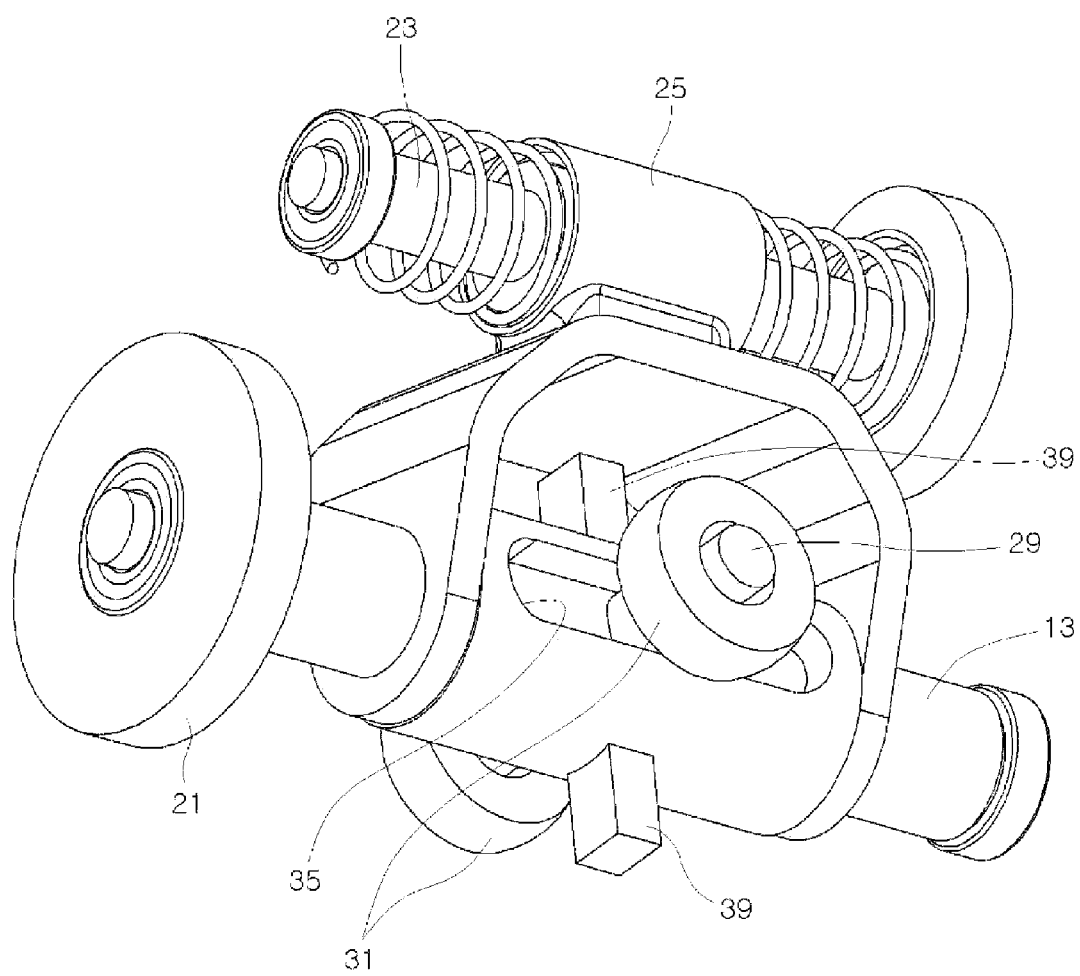
FIG. 7 is a view partially showing the configuration of a shift operating means of the embodiment of FIG. 1.
Figure 8:
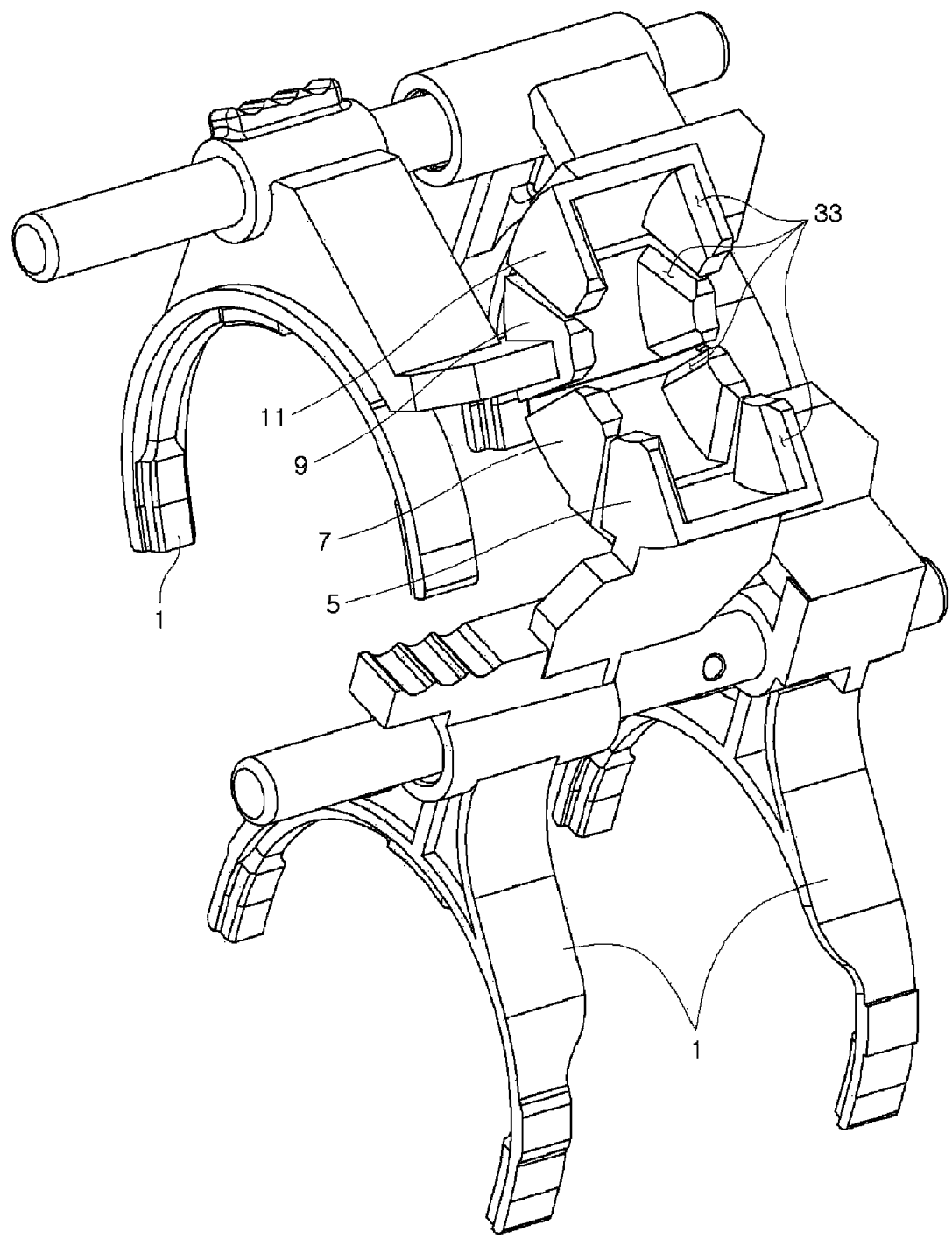
FIG. 8 is a view showing shift lugs and shift forks of the embodiment of FIG. 1.

That is, a 1-3-stage shift lug 5, a 2-4-stage shift lug 7, a 5-stage shift lug 9, and 6-R-stage shift lug 11 are sequentially disposed from the lower side of FIG. 6, in which the first shift stage and second shift stage that are shifted by shift fork 1 connected to 1-3-stage shift lug 5 and the fifth shift stage that is shifted by shift fork 1 connected to fifth shift lug 9 are shifted by the operation of the first clutch of the transmission, and the second shift stage and fourth shift stage that are connected or disconnected by 2-4-stage shift lug and the sixth shift stage and R shift stage that are connected or disconnected by 6-R-stage shift lug are shifted by the operation of the second clutch.

In this embodiment, the shift operating means includes a select shaft 13 that is coaxially disposed with the circle defined by the shift lugs; an automatic releasing unit that protrudes in the radial direction of select shaft 13 and is inserted between both flanges 3 of the shift lug while rotating with select shaft 13; a shift unit that is disposed to rotate with select shaft 13 and can move straight over select shaft 13 with respect to select shaft 13; a select driving unit that is provided to rotate select shaft 13; and a shift driving unit that is provided to move the shift unit straight over select shaft 13.

The shift operating means compactly assembled in a housing 15, the select driving unit includes a select motor 17 that generates rotational force and a gear train that transmits the rotational force of select motor 17 to select shaft 13 as rotational force, the shift driving unit includes a shift motor 19 that generates rotational force and a straight motion converting means that converts the rotational force of shift motor 19 into straight motion force and transmits it to the shift unit.

In this embodiment, the gear train is composed of a worm gear that is rotated by select motor 17 and a worm wheel 21 that is fitted to select shaft 13 to be engaged with the worm and rotated.

In this embodiment, the straight motion converting means of the shift driving unit includes a lead screw 23 that is driven by shift motor 19, a screw nut that moves straight on lead screw, and a transmission fork 27 that is integrally connected with screw nut 25 and restrains both sides of the shift unit.

The automatic releasing unit includes releasing pins 29 that radially protrude at an interval of about 180° on select shaft 13 and rollers 31 that are rotatably fitted on releasing pins 29.

Shift lug has a guide slope 33 such that roller 31 can be easily inserted between both flanges 3 of shift lug and it is preferable that the diameter of roller is substantially close to, but slightly smaller than the width between both flanges 3 to achieve active inter-lock function when the roller is inserted between both flanges of the shift lug such that the shift lug surely returns to the neutral state and does not move.

The shift unit is composed of a shift pipe 37 that has slits 35 through which releasing pins pass and covers select shaft 13 and shift pins 39 that radially protrude from shift pipe 37 and disposed at about 90° from releasing pins 29 to be inserted between both flanges 3 of the shift lug.

Figure 9:
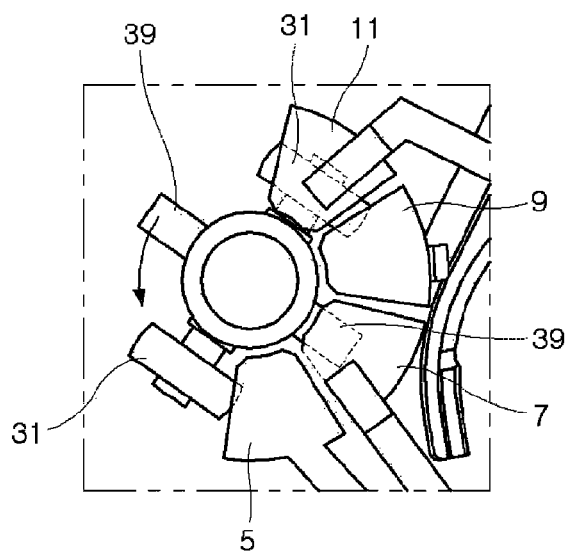
FIG. 9 is a view illustrating the operation of the embodiment of FIG. 1.
Figure 9:
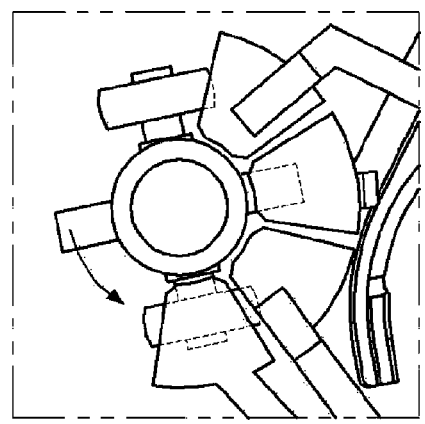
Figure 9:
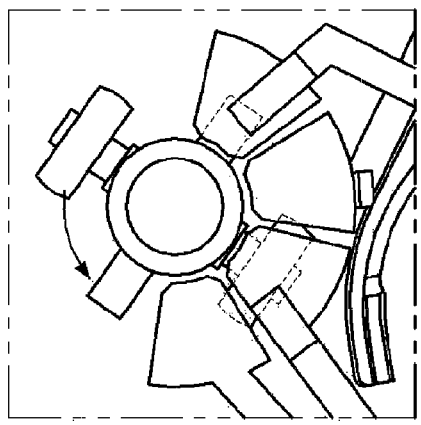
Figure 9:
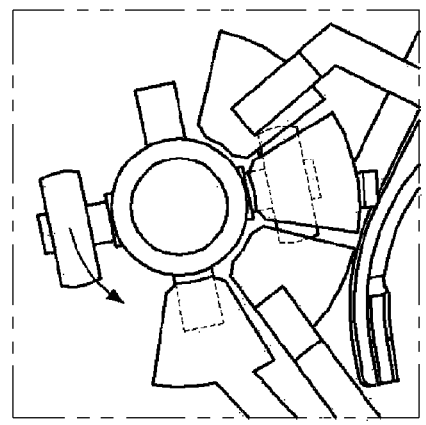

The operation according to one embodiment of the present invention having the above configuration is described hereafter with reference to FIG. 9.

FIG. 9A shows a 3-stage-traveling 4-stage pre-select position. That is, a vehicle is traveling with the 3-stage by engaging the 3-shift stage and the 4-shift stage, which is expected as the next shift, is engaged.

Since the shift lugs can be shifted to predetermined shift stages, respectively, by moving straight to both sides from the neutral stage, the position shown in FIG. 9A may be construed as a 1-stage-traveling 2-stage pre-select position.

In this position, as shift pipe 37 is moved such that shift pin 39 is positioned to the neutral stage by driving shift motor 19 and select shaft 13 is rotated as in FIG. 9B by driving select motor 17, shift pin 39 is positioned to be able to move 5-stage shift lug 9 straight and the automatic releasing function that automatically releases to the neutral state while releasing pin 29 and roller 31 moving into between 1-3-shift lugs 5, such that this position is continuously and stably maintained by the roller, thereby achieving the active inter-lock function.

Shift to the pre-selected 4-stage is performed by rotating select shaft 13, releasing the first clutch for 1-3-stage shift lug 5, and engaging the second clutch for 2-4-stage shift lug 7.

Next, as 5-stage shift lug 9 is moved straight by driving shift motor 19, the 5-stage is pre-selected to directly make output of 5-stage transmission gear ratio when power is transmitted.

As the position shown in FIG. 9C is achieved by driving shift motor 19 and select motor 17 from the above position, similar to the above operation, the roller automatically releases 2-4-stage shift lug 7, the second clutch is released and the first clutch is engaged, such that the 4-shift stage is released while power at the 5-shift stage is outputted, and shift pin 39 moves 6-R-stage shift lug 11 straight to pre-select the 6-shift stage.

As the position shown in FIG. 9D is achieved by driving shift motor 19 and select motor 17 from the above position, a 6-stage-traveling 3-stage pre-select position is achieved, such that it is ready for the 6-3 skip shift.

That is, with the 6-shift stage pre-selected, releasing pin 29 and roller 31 automatically release 5-stage shift lug 9 by driving shift motor 19 such that shift pin 39 is positioned to the neutral state, and driving select motor 17 such that shift pin 39 moving into between 1-3-stage shift lug 5 and flanges 3.

Simultaneously, the 5-shift stage is released and the 6-stage traveling is achieved by releasing the first clutch and engaging the second clutch, and preparation for 6-3 skip shift is completed by driving shift motor 19 such that shift pin 39 engages the 3-shift stage in advance.

Further, the 6-3 skip shift for shift from the 6-stage to the 3-stage is completed by releasing the second clutch and engaging the first clutch while converting into the position shown in FIG. 9B from the above position.

Further, 5-2 skip shift is achieved in the same way as the 6-3 skip shift and detailed description is not provided.

As described above, a device according to one embodiment of the present invention has a simple structure that can provide sufficient rigidity to the configuration of the shift lugs and shift pin 39, releasing pin 29, and roller 31 for operating them, and the operation can be smoothly achieved, such that it is possible to achieve a shifting apparatus for a duel clutch transmission having simple configuration, high durability, and smooth operation, at low cost.

Figure 10:
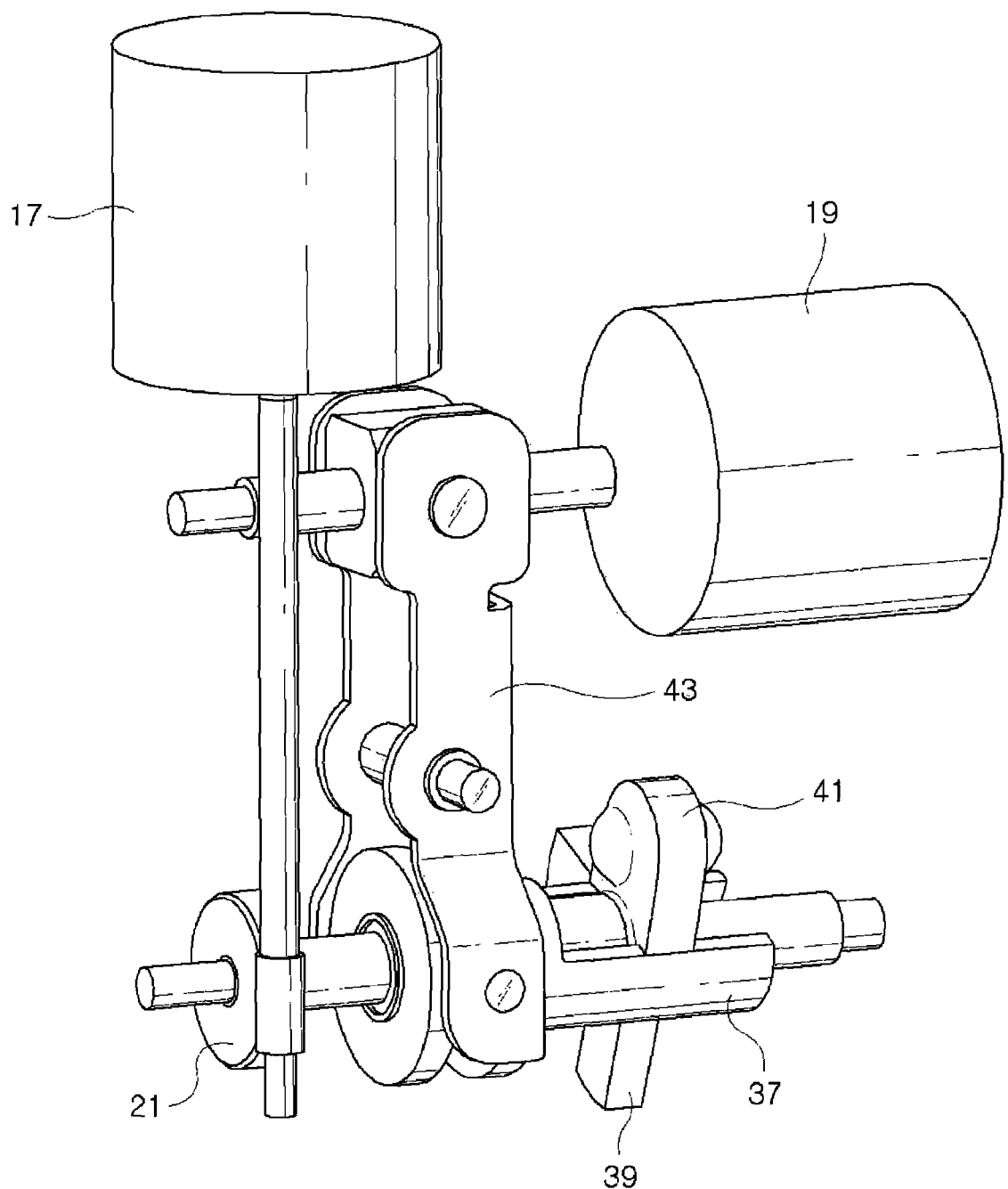
FIGS. 10 and 11 are views showing another embodiment of a shift apparatus for a dual clutch transmission according to one embodiment of the present invention.
Figure 11:
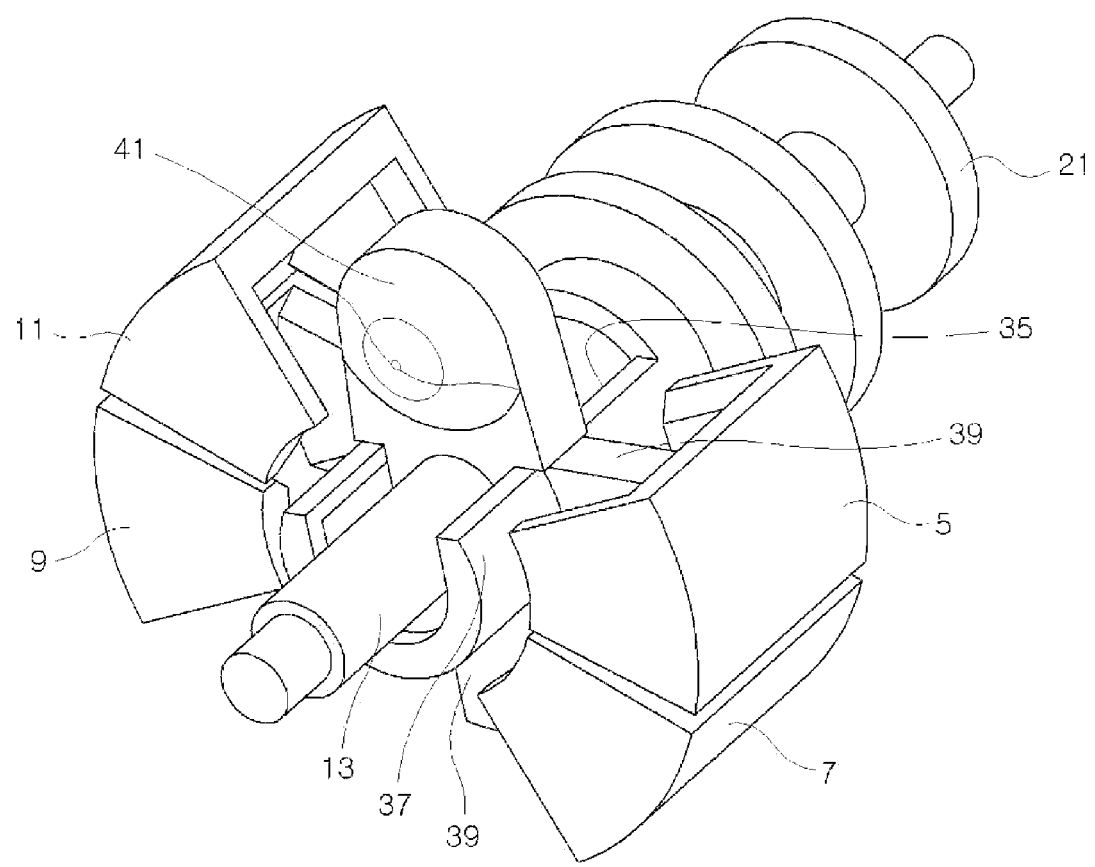
Figure 12:
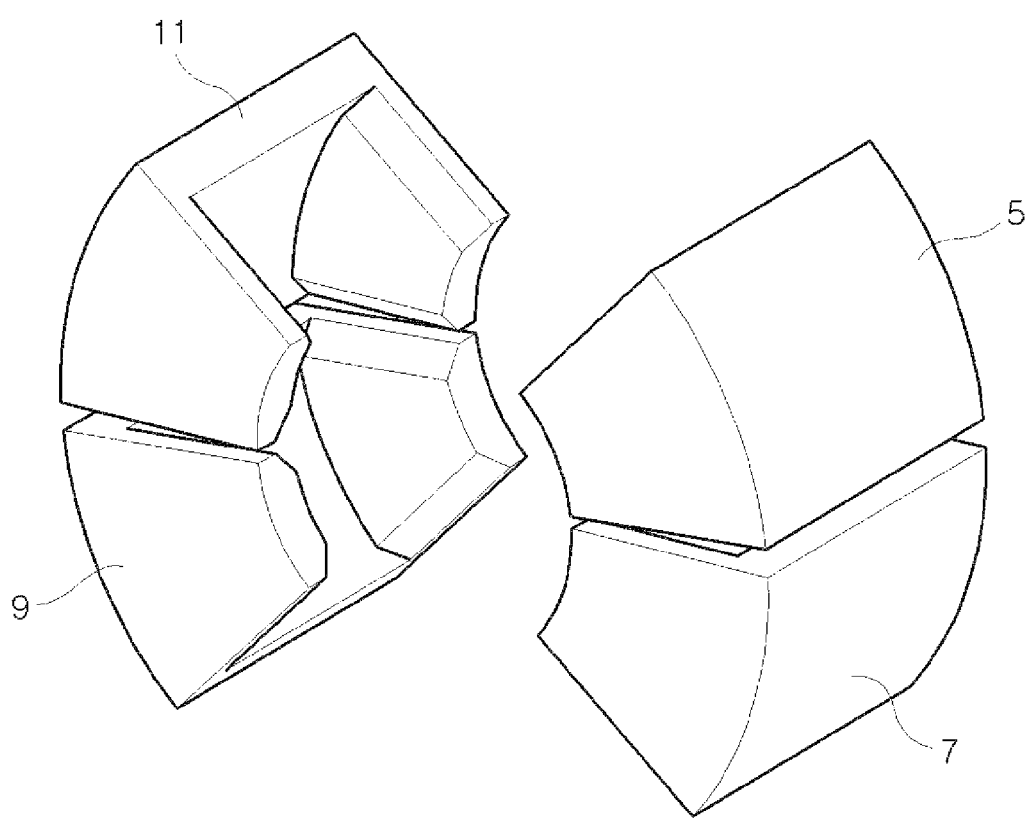
FIG. 12 is a view showing shift lugs of the embodiment of FIG. 11.

FIGS. 10 to 12 show other embodiments of the present invention, in which the arrangement of the shift lugs is different and some parts, such as the straight movement converting means of the shift driving unit, were differently configured, but the other configurations are the same as in the above embodiment.

In this embodiment, four shift lugs, of which two adjacent shift lugs make a pair, respectively, are arranged symmetrically with respect to the center of circle defined by the shift lugs, in which shift lugs connected to shift fork 1 that shifts the shift stages connected or disconnected by the same clutch are symmetrically arranged with respect to the center of the circle.

That is, as shown in FIG. 12, a 1-3-stage shift lug 5 and a 2-4-stage shift lug 7 make a pair, a 5-stage shift lug 9 and a 6-R-stage shift lug 11 make a pair, a 1-3-stage shift lug and 5-stage shift lug 9 are symmetrically arranged, 2-4-stage shift lug 7 and 6-R-stage shift lug 11 are symmetrically arranged, the 1-3-stage shift lug and 5-stage shift lug 9 operate with the first clutch and 2-4-stage shift lug 7 and 6-R-stage shift lug 11 operate with the second clutch.

The automatic releasing unit is formed of a releasing finger 41 that radially protrudes from a select shaft 13, and the shift unit is composed of a shift pipe 37 that has a slit where releasing finger 41 is inserted to prevent rotation and allow straight movement with respect to each other, and covers select shaft 13, and shift pins 39 that radially protrude from shift pipe 37 and are arranged at about 90° and about 180° from releasing finger 41 to be inserted between both flanges 3 of the shift lug.

The straight movement converting unit of the shift driving unit includes a lead screw 23 that is driven by a shift motor 19, a screw nut 25 that moves straight on lead screw 23, and a rotary lever 43 that transmits straight motion of screw nut 25 to straight motion of shift pipe 37.

Figure 13:
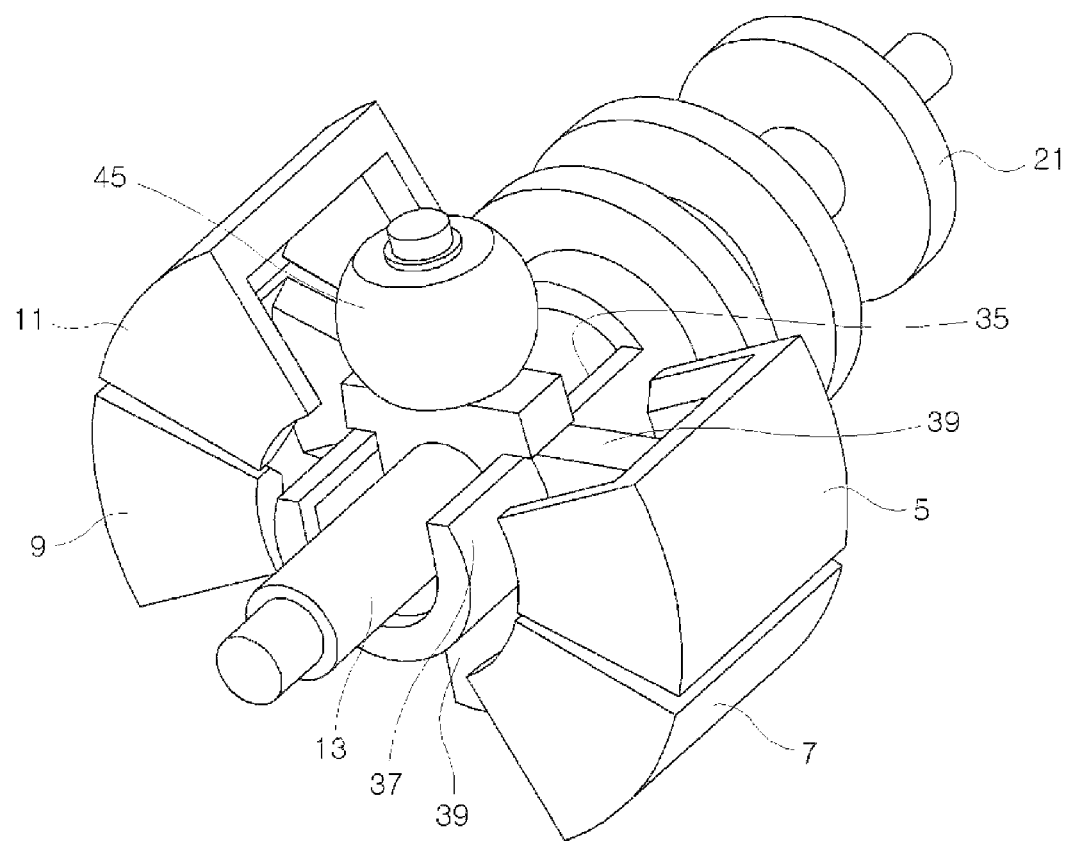
FIG. 13 is a view showing another embodiment different from FIG. 11.

The automatic releasing unit may be composed of a releasing pin 29 radially protruding from select shaft 13 and a spherical roller 45 rotatably fitted on releasing pin 29, as shown in FIG. 13.

Figure 14:
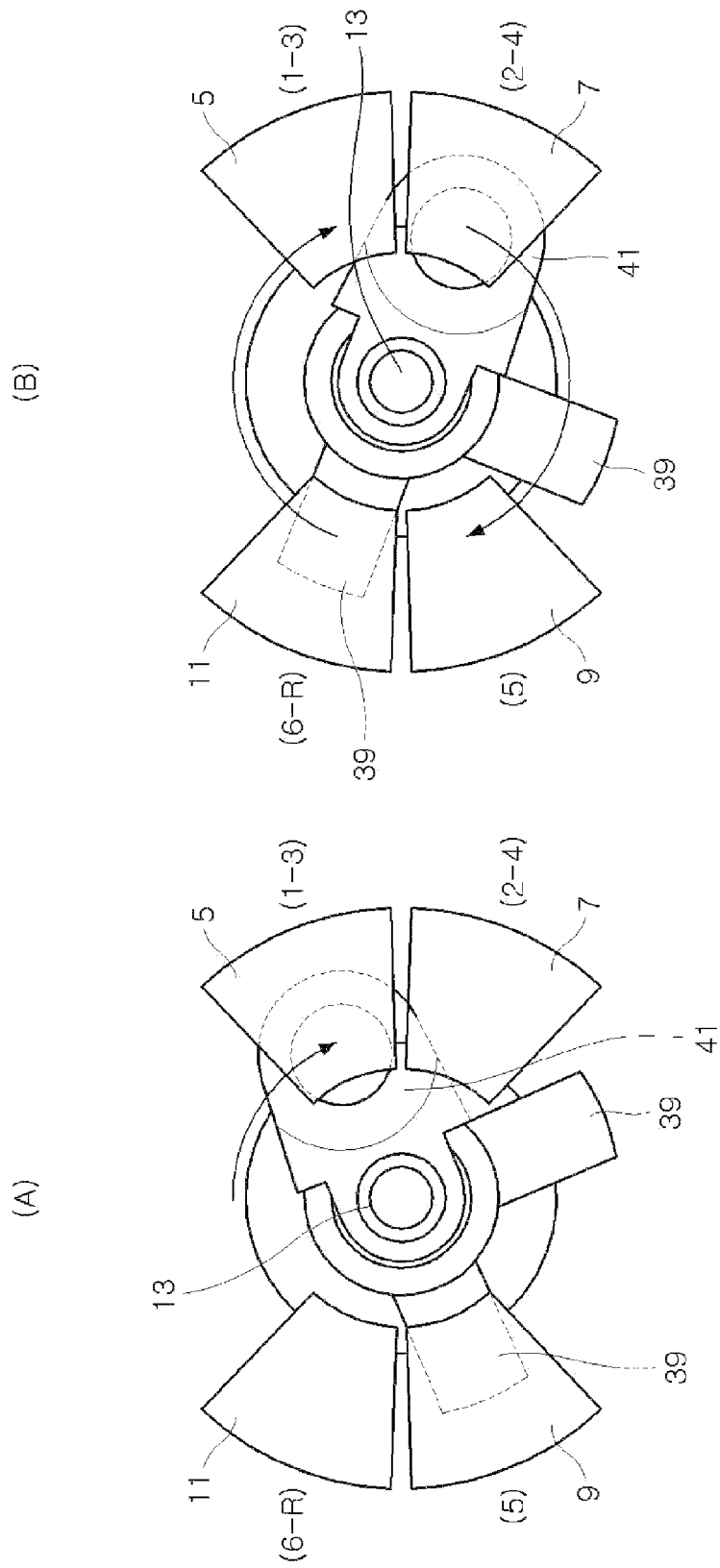
FIG. 14 is a view illustrating the operation of the embodiment shown in FIGS. 10 and 11.

The operation of this embodiment is described hereafter with reference to FIG. 14.

FIG. 14A shows a 4-stage-traveling 5-stage pre-select position, in which releasing finger 41 automatically releases 1-3-stage shift lug 5 while moving into 1-3-stage shift lug 5 and this released position is stably maintained by releasing finger 41 preventing movement of 1-3-stage shift lug 5, thereby achieving the active inter-lock function that prevents gears connected to the same clutch from being engaged simultaneously.

As shift motor 19 is driven after shift pin 39 is inserted in 5-stage shift lug 9, the 5-shift stage is pre-selected and engaged, such that it is possible to quickly operate the next shift.

When the position shown in FIG. 14B is achieved by driving select motor 17 to rotate select shaft 13 from the above position, releasing finger 41 automatically releases 2-4-stage shift lug 7, the second clutch is released and the first clutch is engaged, such that power at the pre-selected 5-shift stage is outputted and shift pin 39 moves straight 6-R-stage shift lug 11 by operation of shift motor 19, thereby pre-selecting the 6-shift stage.

The 6-3 skip shift can also be achieved in this embodiment, in which shift pin 39 and releasing finger 41 rotate along the arrows shown in FIG. 14B, such that a 6-stage-traveling 3-stage pre-select position is achieved and then the 3-stage traveling is achieved by shifting again.

Shift to the other shift stages is achieved in the same ways described above, which is not further described.

What is claimed is:

1. A shift apparatus for a dual clutch transmission, the apparatus comprising:
   a plurality of shift lugs, each of which is connected to a shift fork to transmit straight movement force to the shift fork, and is configured to move between a shift stage position and a neutral state position, the shift lugs being arranged around a first axis, wherein each shift lug comprises two opposing flanges, each of which is tapered in a radial direction toward the first axis; and
   a shift operating module comprising a first shaft and a second shaft, the first shaft being configured to rotate about the first axis, the second shaft being configured to rotate along with the first shaft and move linearly along the first axis with respect to the first shaft such that the linear movement causes a first one of the shift lugs to move to the shift stage position and the rotation causes a second one of the shift lugs to move to the neutral state position,
wherein the shift operating module comprises a shift release roller connected to the first shaft, the shift release roller being configured to rotate about a second axis perpendicular to the first axis, and the shift release roller being further configured to be inserted between the two opposing flanges of the second shift lug upon rotation of the first shaft such that the second shift lug moves to the neutral state position.

2. The shift apparatus for a dual clutch transmission as defined in claim 1, wherein the shift operating module comprises:
the first shaft comprising a select shaft extending along the first axis;
an automatic releasing unit that radially protrudes from the select shaft and comprises the shift releasing roller; and
the second shaft comprising a shift unit that is configured to rotate about the first axis along with the select shaft and further configured to move linearly along the first axis with respect to the select shaft.

3. The shift apparatus for a dual clutch transmission as defined in claim 2, wherein the shift operating module further comprises:
a select driving unit configured to rotate the select shaft, the select driving unit comprising a select motor configured to generate rotational force and a gear train configured to transmit the rotational force of the select motor to the select shaft as rotational force, and
a shift driving unit configured to move the shift unit along the first axis, the shift driving unit comprising a shift motor configured to generate rotational force and a straight movement converter configured to convert the rotational force of the shift motor into straight movement force and further configured to transmit the straight movement force to the shift unit.

4. The shift apparatus for a dual clutch transmission as defined in claim 3, wherein the plurality of shift lugs comprising four shift lugs sequentially arranged about the first axis at about 45° interval along a semicircle to form a radial arrangement,
wherein the automatic releasing unit comprising:
releasing pins radially protruding from the select shaft and opposing each other, and
the shift release roller and another shift release roller, each rotatably combined with one of the releasing pins, and
wherein the shift unit comprising:
a shift pipe having slits through which the releasing pins pass and covering the select shaft, and
shift pins radially protruding from the shift pipe and disposed at about 90° from the releasing pins to be inserted between both flanges of the shift lugs.

5. The shift apparatus for a dual clutch transmission as defined in claim 4, wherein the four shift lugs comprise a first shift lug and a second lug immediately neighboring the first shift lug, wherein the first shift lug is configured to form a first shift stage associated with the operation of a first clutch, wherein the second shift lug is configured to form a second shift stage associated with the operation of a second clutch.

6. The shift apparatus for a dual clutch transmission as defined in claim 5, wherein the four shift lugs comprise a third shift lug immediately neighboring the second shift lug such that the second shift lug is interposed between the first and third shift lugs, wherein the third shift lug is configured to form a third shift stage associated with the operation of the first clutch.

7. The shift apparatus for a dual clutch transmission as defined in claim 4, wherein the straight movement converter of the shift driving unit comprises a lead screw driven by the shift motor, a screw nut configured to move straight on the lead screw, and a transmitting fork integrally connected with the screw nut and configured to restrain both sides of the shift unit.

8. The shift apparatus for a dual clutch transmission as defined in claim 3, wherein the plurality of shift lugs comprising a first pair of two adjacent shift lugs and a second pair of two adjacent shift lugs, wherein the first pair and the second pair are arranged symmetrically with respect to the first axis, wherein the shift lugs of each pair are configured to form different shift stages associated with the operation of different clutches, respectively, wherein a first shift lug of the first pair and a second shift lug of the second pair are configured to form different shift stages associated to the operation of the same clutch and are symmetrically arranged with respect to the first axis,
wherein the automatic releasing unit comprises a releasing pin radially protruding from the select shaft and the shift release roller rotatably combined with the releasing pin, and
wherein the shift unit comprising a shift pipe that has a slit through which the releasing pin passes to prevent rotation and allow straight movement of the shift pipe with respect to the releasing pin, and shift pins that radially protrude from the shift pipe and are arranged at about 90° and about 180° from the releasing pin.

9. The shift apparatus for a dual clutch transmission as defined in claim 8, wherein the straight movement converter of the shift driving unit comprises a lead screw driven by the shift motor, a screw nut configured to move straight on the lead screw, and a rotary lever configured to transmit the straight motion of the screw nut to the straight motion of the shift pipe.

10. The shift apparatus for a dual clutch transmission as defined in claim 1, wherein each flange is fan-shaped.

11. The shift apparatus for a dual clutch transmission as defined in claim 1, wherein the plurality of shift lugs are arranged around the first axis such that the tapered flanges of the plurality of shift lugs are arranged side by side.

12. The shift apparatus for a dual clutch transmission as defined in claim 1, wherein the plurality of shift lugs comprising four shift lugs sequentially arranged about the first axis at about 45° intervals.

13. The shift apparatus for a dual clutch transmission as defined in claim 1, wherein the plurality of shift lugs comprising a first pair of two adjacent shift lugs arranged side by side and a second pair of two adjacent shift lugs arranged side by side, wherein the first pair and the second pair are arranged symmetrically with respect to the first axis, wherein the shift lugs of each pair are configured to form different shift stages associated with the operation of different clutches, respectively, wherein a first shift lug of the first pair and a second shift lug of the second pair are configured to form different shift stages associated to the operation of the same clutch and are symmetrically arranged with respect to the first axis.

* * * * *